US009065976B2

(12) United States Patent
Hegde et al.

(10) Patent No.: US 9,065,976 B2
(45) Date of Patent: *Jun. 23, 2015

(54) MULTI-DEVICE CAPTURE AND SPATIAL BROWSING OF CONFERENCES

(71) Applicant: Microsoft Corporation, Redmond, WA (US)

(72) Inventors: Rajesh K. Hegde, Redmond, WA (US); Zhengyou Zhang, Bellevue, WA (US); Philip A. Chou, Bellevue, WA (US); Cha Zhang, Sammamish, WA (US); Zicheng Liu, Bellevue, WA (US); Sasa Junuzovic, Carrboro, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

This patent is subject to a terminal disclaimer.

(21) Appl. No.: 13/938,144

(22) Filed: Jul. 9, 2013

(65) Prior Publication Data
US 2014/0009562 A1    Jan. 9, 2014

Related U.S. Application Data

(63) Continuation of application No. 12/245,774, filed on Oct. 6, 2008, now Pat. No. 8,537,196.

(51) Int. Cl.
*H04N 7/14* (2006.01)
*G06F 15/16* (2006.01)
(Continued)

(52) U.S. Cl.
CPC ............... *H04N 7/157* (2013.01); *H04N 7/147* (2013.01)

(58) Field of Classification Search
USPC ............. 348/14.08, 14.09; 709/204, 205; 715/751, 753, 755, 756, 757, 759
See application file for complete search history.

(56) References Cited

U.S. PATENT DOCUMENTS 5,347,306 A    9/1994   Nitta
6,285,392 B1   9/2001   Satoda et al.
(Continued)

OTHER PUBLICATIONS

Jaimes, et al. "Recording, Indexing, Summarizing, and Accessing Meeting Videos: An Overview of the AMI Project", Retrieved at <<www.amiproject.org/pdf/Overview%20of%20AMI%20Project.pdf>>, in 14th Intl. Conference on Image Analysis and Processing (ICIAP 2007) & Workshop on Visual and Multimedia Digital Libraries (VMDL 2007), Modena, Italy, Sep. 10-14, 2007, pp. 6.
(Continued)

*Primary Examiner* — Christopher M Brandt
(74) *Attorney, Agent, or Firm* — Dan Choi; Judy Yee; Micky Minhas (57) ABSTRACT

Multi-device capture and spatial browsing of conferences is described. In one implementation, a system detects cameras and microphones, such as the webcams on participants' notebook computers, in a conference room, group meeting, or table game, and enlists an ad-hoc array of available devices to capture each participant and the spatial relationships between participants. A video stream composited from the array is browsable by a user to navigate a 3-dimensional representation of the meeting. Each participant may be represented by a video pane, a foreground object, or a 3-D geometric model of the participant's face or body displayed in spatial relation to the other participants in a 3-dimensional arrangement analogous to the spatial arrangement of the meeting. The system may automatically re-orient the 3-dimensional representation as needed to best show a currently interesting event.

20 Claims, 9 Drawing Sheets

(51) Int. Cl.
*G06F 3/048* (2013.01)
*H04N 7/15* (2006.01)

(56) References Cited

U.S. PATENT DOCUMENTS

| | | |
|---|---|---|
| 6,330,022 B1 | 12/2001 | Seligmann |
| 6,753,857 B1 | 6/2004 | Matsuura et al. |
| 6,937,266 B2 | 8/2005 | Rui et al. |
| 7,113,201 B1 | 9/2006 | Taylor et al. |
| 7,139,767 B1 | 11/2006 | Taylor et al. |
| 7,358,985 B2 | 4/2008 | Uchihashi et al. |
| 7,672,378 B2 | 3/2010 | Ng et al. |
| 2002/0093538 A1 | 7/2002 | Carlin |
| 2003/0067536 A1 | 4/2003 | Boulanger et al. |
| 2003/0182130 A1 | 9/2003 | Sun et al. |
| 2004/0001137 A1 | 1/2004 | Cutler et al. |
| 2004/0008423 A1 | 1/2004 | Driscoll et al. |
| 2004/0103148 A1 | 5/2004 | Aldrich |
| 2004/0263636 A1 | 12/2004 | Cutler et al. |
| 2005/0129325 A1 | 6/2005 | Wu |
| 2005/0237376 A1 | 10/2005 | Roessler et al. |
| 2006/0092267 A1 | 5/2006 | Dempski et al. |
| 2006/0200518 A1 | 9/2006 | Sinclair et al. |
| 2006/0209181 A1 | 9/2006 | Van Geest |
| 2006/0256210 A1 | 11/2006 | Ryall et al. |
| 2006/0291014 A1 | 12/2006 | Hirata et al. |
| 2007/0279483 A1 | 12/2007 | Beers et al. |
| 2007/0279484 A1 | 12/2007 | Derocher et al. |
| 2008/0008458 A1 | 1/2008 | Gudipaty et al. |
| 2008/0246840 A1 | 10/2008 | Larson et al. |
| 2009/0033737 A1 | 2/2009 | Goose et al. |
| 2009/0073556 A1 | 3/2009 | Bent-Gourley |
| 2009/0264114 A1 | 10/2009 | Virolainen et al. |
| 2009/0290024 A1 | 11/2009 | Larson et al. |
| 2010/0037151 A1 | 2/2010 | Ackerman et al. |

OTHER PUBLICATIONS

Charif, et al. "Tracking the Activity of Participants in a Meeting", Retrieved at <<http://www.computing.dundee.ac.uk/staff/stephen/mva.pdf>>, Published in the journal Machine Vision and Applications 17(2):83-93, 2006, pp. 1-14.

Flynn, et al. "Ferret Meeting Browser—User Guide ", Retrieved at <<http://mmm.idiap.ch/documentation/Ferret_User_Guide/help.html>>, IDIAP COM report 07, 2003, pp. 1-4.

Cutler, et al.; "Distributed Meetings: A Meeting Capture and Broadcasting System," in Multimedia '02, Proceedings of the ACM International Conference on Multimedia; Nice, France; Dec. 1, 2002, pp. 503-512.

Chiu, et al., "Meeting Capture in a Media Enriched Conference Room," in CoBuild '99, Proceedings of the Second International Workshop on Cooperative Buildings, Integrating Information, Organization, and Architecture; Appears in LNCS: Lecture Notes in Computer Science, vol. 1670; Oct. 1, 1999, pp. 79-88.

Cutler, et al. " Distributed Meetings: A Meeting Capture and Broadcasting System ", Retrieved at http://research.microsoft.com/~yongrui/ps/mm02.pdf>>, pp. 10.

Chiu, et al. "Meeting Capture in a Media Enriched Conference Room", Retrieved at<<http://www.fxpal.com/publications/FXPAL-PR-99-118.pdf>>, Final Version. To appear in Proceedings of CoBuild'99, pp. 1-10.

MULTI-DEVICE CAPTURE AND SPATIAL BROWSING OF CONFERENCES

CROSS-REFERENCE TO RELATED APPLICATIONS

This patent application is a continuation of, and claims priority from, U.S. patent application Ser. No. 12/245,774 filed on Oct. 6th, 2008, which is hereby incorporated by reference in its entirety.

BACKGROUND

Viewing recorded conferences and small-group meetings on conventional players that provide fixed or isolated views of each participant does not provide sufficient information and control to the user who is viewing the recording. Various interactions between the participants that assist in fully understanding the communication are typically not captured by conventional techniques for recording conferences, or are not visible on conventional players used to view a recorded conference later. Thus, the user is likely to miss nuances of communication that were present at the live meeting.

Most users electronically viewing a conference desire more incidental information, such as who the speaker is talking to, who the speaker is making eye contact with, who is interrupting the speaker, and what is happening among the non-speaking participants. Users may want control of context views that show the non-speaking participants in greater detail.

In a typical conventional conference recording scenario, consider a meeting in which five attendees, Alice, Bob, Charlie, Dave, and Eve, are seated around a table. Each attendee's face is captured in a frontal view by a different camera provided with the conference recording equipment. In the user interface of a typical conventional conference player, a large view of the currently interesting event such as current speaker is displayed above thumbnail-size videos of all of the attendees. A panoramic view of the entire meeting room can be shown instead of the thumbnails if an omnidirectional camera is available to capture the meeting.

There are at least two sets of issues with the conventional user interfaces for viewing recorded meetings. One set of issues include the difficulties in interpreting speaker-oriented information, such as who the speaker is talking to, looking at, or being interrupted by. While some of this information can be implicit in the dialogue, there are times when it is not. For instance, during the meeting Bob may ask "What are the fourth quarter profits like?" which sparks a discussion on the company performance in general. Eventually, to answer Bob's question, Alice says "Returning to your question . . . " and looks at Bob. At that point, everyone present in the meeting room knows that Alice wants to discuss fourth-quarter profits. However, an observer, such as a remote viewer, without the knowledge of who Alice is looking at may get confused. Moreover, as a part of her answer to Bob's question, Alice says "They are better than we expected" and briefly looks at Charlie, who is the accountant, for confirmation. Charlie agrees by nodding without interrupting. At the same time, Eve agrees by saying "Much much better," which causes Alice to glance in Eve's direction. Everyone in the meeting knows that Charlie and Eve agree with Alice's claim. Someone who is later viewing a recording of this meeting, on the other hand, may neither realize that Charlie agrees with Alice as Charlie does not say anything nor be able to figure out that it was Eve who confirmed what Alice said. The reason is that in the conventional user interface, it is difficult to interpret the direction in which the speaker, or any other attendee, is looking. For instance, when Alice is looking at Eve, she may be looking straight-ahead, which to the users appears as if she is looking at them. Moreover, the user cannot easily tell that Alice first looks at Charlie and then at Eve, regardless of whether the user interface displays thumbnail-size videos of the attendees or a panoramic video of the meeting room.

Another set of issues with conventional user interfaces for viewing meetings concerns context views that do not allow the user to control aspects of the overview. The lack of control, combined with the small visual size of participants in the thumbnail or panoramic views makes it difficult to focus on a non-speaking attendee even though there are instances when the speaker is not the focus of attention.

Also, most conventional systems require substantial infrastructure or hardware setup, such as an omnidirectional camera, a specially positioned IP camera (webcam) and microphones, and carefully designed rooms with dedicated high-speed connections among remote sites. These systems are expensive and difficult to set up.

SUMMARY

Multi-device capture and spatial browsing of conferences is described. In one implementation, a system detects cameras and microphones, such as the webcams on participants' notebook computers, in a conference room, group meeting, or table game, and enlists an ad-hoc array of available devices to capture each participant and the spatial relationships between participants. A media stream composited from the array (e.g., a composited audio-video stream containing the information from multiple video streams and multiple audio streams) is browsable by a user to navigate a 3-dimensional representation of the meeting. Each participant may be represented by a video pane, a foreground object, or a 3-D geometric model of the participant's face or body displayed in spatial relation to the other participants in a 3-dimensional arrangement analogous to the spatial arrangement of the meeting. The system may automatically re-orient the 3-dimensional representation as needed to best show the currently interesting event such as current speaker or may extend navigation controls to a user for manually viewing selected participants in detail or nuanced interactions between the participants.

This summary section is not intended to give a full description of the subject matter, or to provide a list of features and elements. A detailed description of example embodiments follows.

DETAILED DESCRIPTION

Overview

Figure 1:
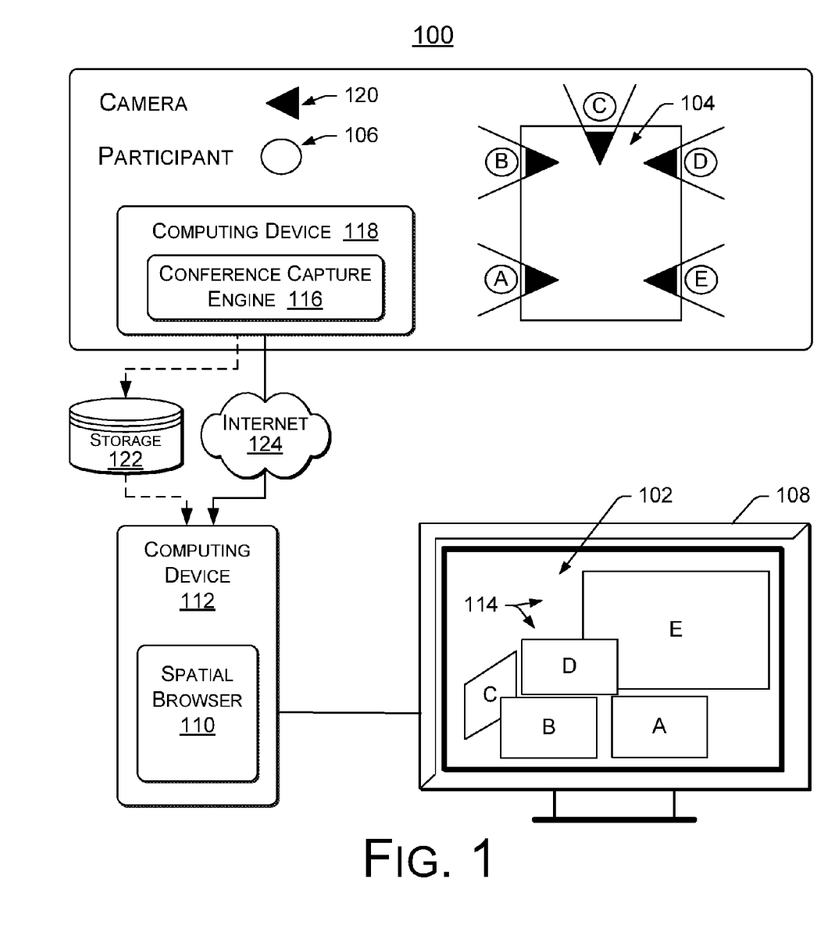
FIG. 1 is a diagram of an exemplary spatial browsing system for capturing and viewing conferences.

This disclosure describes multi-device capture and spatial browsing of conferences. As shown in FIG. 1, an exemplary spatial browsing system 100 provides a user interface 102 for viewing a meeting or conference 104, in which the spatial relationship between conference attendees or meeting participants 106 is preserved. The terms "meeting" and "conference" are used somewhat interchangeably herein, and refer to a gathering of collocated human participants in relatively stable positions; within speaking distance of each other or within close enough proximity to view each others' expressions and body language. Examples of meetings include such diverse gatherings as a small group gathered in a video conferencing room, a group planning session, a board of directors meeting around a roundtable, small educational classes, panel discussions, music recording studio sessions, tournaments and table games for such activities as poker, roulette, craps, etc.

A user viewing the meeting on a display 108 uses an exemplary spatial browser 110, hosted by a conference viewing device or other computing device 112. The computing device 112 can be a desktop or notebook computer, or other device that has a processor, memory, data storage, etc. The spatial browser 110 displays video streams of at least some meeting participant 106 arranged in a 3-dimensional (3-D) representation 114 according the spatial relationships between the actual participants 106. For example, in FIG. 1, "A," "B," "C," "D," and "E" represent one example 3-D representation 114 of the video streams corresponding to Alice, Bob, Charlie, Dave, and Eve, arranged on the display 108 in a spatial analogy of the actual positions of Alice, Bob, Charlie, Dave, and Eve in a meeting. The 3-dimensional representation 114 is dynamic and can be reoriented to emphasize different interesting events, typically events related to the participants during the meeting, or to enable manual navigation around the meeting. The exemplary user interfaces described herein are referred to as 3-D interfaces as they use a 3-D analogy to preserve the spatial relationships among the attendees. Likewise, the conventional interfaces are 2-D interfaces because they display the videos in a non-3-D environment.

Conventional meeting viewers that have a user interface consisting of a speaker pane and a fixed context view that shows each non-speaking participant in a disconnected, isolated thumbnail or in a general panoramic view, do not provide sufficient information and control to the users. By comparison, the exemplary spatial browsing system 100 described herein provides speaker-related information, including who the speaker is talking to, who the speaker is looking at, and who the speaker is being interrupted by. The exemplary system 100 also provides more control of the user interface through advanced navigation of the 3-D representation of the participants, including changing the relative sizes of the speaker view and the context views and navigating within the context view to see interactions and reactions of the non-speaking participants.

To achieve spatial browsing, the exemplary system 100 captures the spatial relationships between participants 106 during the conference or meeting. In one implementation, a conference capture engine 116, hosted by a conferencing device or other computing device 118, detects cameras 120 (and microphones) in the meeting space, selects an array of the cameras to capture videos of each of the participants and the spatial characteristics of the meeting space. The conference capture engine 116 combines the video streams from the cameras 120 into a composite media stream, browsable by the user to navigate the 3-dimensional representation 114 of the participants 106 in the meeting space.

Cameras selected to capture the meeting capture videos (i.e., "views") of at least some of the meeting participants. A camera may obtain a video feed of the participant's face, e.g., a frontal view, or may obtain a bust view or body view, etc., of the participant. Microphones selected to capture the meeting obtain spatial audio that corresponds to the participants' locations in the meeting. This allows the spatial browser 110 to recreate spatial audio for the user, including stereo or surround-sound. Thus, in the case of stereo, in one scenario when Charlie is the speaker, Alice's audio would come from the extreme left, Bob's from slightly left, Dave's from slightly right, and Eve's from extremely right. Charlie's audio would come from the center. when someone relatively distant speaks; the volume may be adjusted down, and when someone relatively close speaks, the volume may be adjusted up.

In one implementation, the conference capture engine 116 gathers 3-D shape information of meeting participants in order to encode the 3-D information into the composite media stream. This enables the spatial browser 110 to derive a 3-D model of individual meeting participants for display. In some circumstances, a depth camera, such as an infrared depth camera, or an array of visible light cameras can be recruited to capture a participant's 3-D attributes. The 3-dimensionally modeled meeting participants are then displayed in the context of the spatial arrangement of the meeting (instead of displaying a merely flat or rectangular video pane of each participant positioned in the spatial arrangement of the meeting).

In another or the same implementation, the component video streams are segmented to separate a foreground (showing the meeting participant) from a visual background of each component video stream—i.e., to obtain the video image of each meeting participant as a cutout foreground object. Then the foregrounds are displayed in the spatial arrangement of the meeting while the respective backgrounds of each component video stream are discarded.

Likewise, an arbitrary background can be selected for the cutout foreground objects to transport the meeting participants from the actual meeting room to a more scenic, more proper, or more instructional setting.

The composite media stream containing videos of each meeting participant, and also the spatial relationships between the participants, can be recorded in a data storage medium 122, either at the location of the conference 104, the location of a remote user, or on a network, and retrieved for later viewing via the spatial browser 110. Or, the conference 104 can be viewed in real time, for example over a network, such as the Internet 124 as shown in FIG. 1.

In one implementation, the spatial browser 110 offers at least two modes, an automatic mode and a manual navigation mode. The automatic mode automatically emphasizes (highlights, enlarges, centers, etc.) the currently interesting event, which can be the participant who is currently speaking or can be an emotional, gestural, behavioral, or expected (but absent) reaction of one of the meeting participants; or some other interesting occurrence of the meeting. Typically the currently interesting event or currently interesting participant (hereinafter collectively referred to as "currently interesting event") is displayed in an emphasized way, such as in an enlarged visual pane. As the currently interesting event changes, e.g., as when another participant speaks, the 3-dimensional representation reorients (e.g., rotates around an imaginary table) to emphasize the new speaker, while maintaining the spatial relationships between the other participants. Preserving the spatial relationships allows the user of the spatial browsing system 100 to observe verbal and visual interactions between the participants, including the speaker, that are not observable with conventional meeting viewers.

In a manual navigation mode, the spatial browser 110 extends navigation controls to the user, so that the user can select which currently interesting event, participant, or part of the meeting space to observe, while spatial relationships between all the participants are preserved, for context. For example, the user may be interested in observing a conversation among the four people at the end of the table. The user can navigate between participants and/or around the meeting space. The user can also zoom, pan, rotate, and tilt the 3-dimensional environment shown in the context view.

Exemplary Conference Capture Engine

Figure 2:
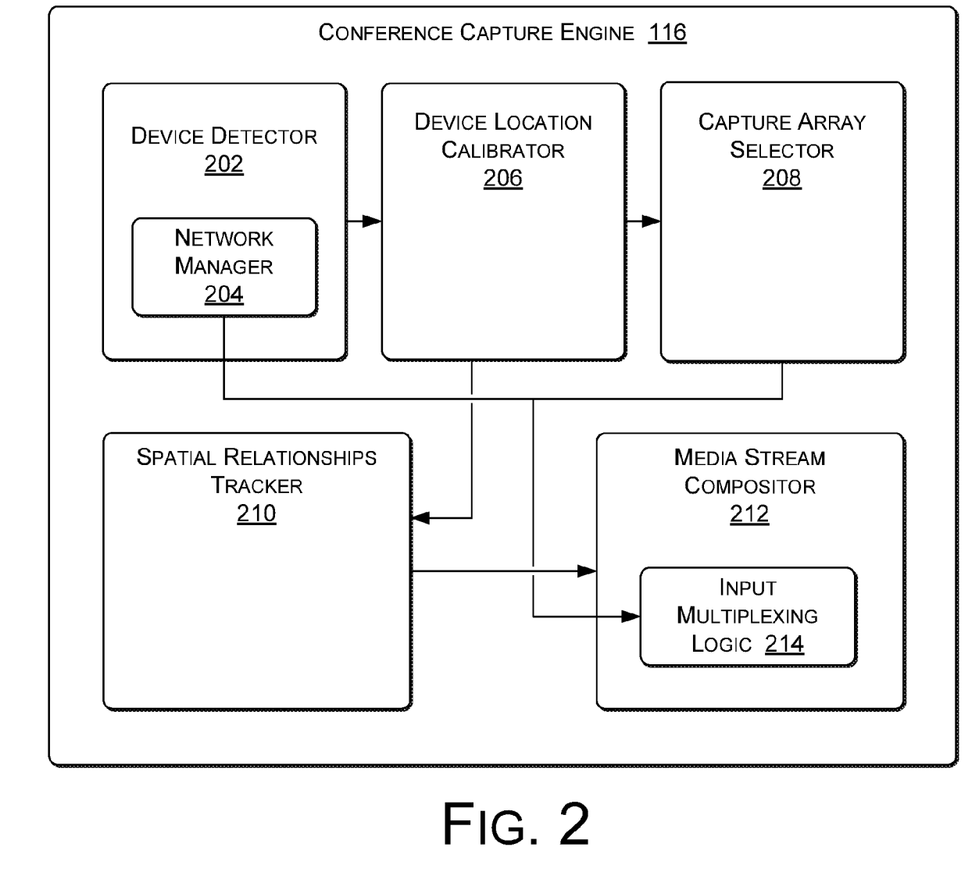
FIG. 2 is a block diagram of an exemplary conference capture engine.

FIG. 2 shows the exemplary conference capture engine 116 of FIG. 1, in greater detail. The configuration of the illustrated conference capture engine 116 is just one example, for the sake of description. Other configurations of hardware and software to capture a conference, including spatial video information and spatial audio information, can also be used.

The exemplary conference capture engine 116 includes a device detector 202, for detecting the presence and availability of media devices, such as cameras and microphones. In one implementation, the device detector 202 has the broader function of detecting and/or inputting not only the presence of cameras and microphones, but also accessories such as projectors, sensors, lighting, and so forth. The exemplary conference capture engine 116 also includes a network manager 204 to communicate with candidate devices, a device location calibrator 206, a capture array selector 208, a spatial relationships tracker 210, and a media stream compositor 212 that may also include input multiplexing logic 214 to handle multiple video streams and multiple microphone feeds.

The device detector 202 takes an inventory of available capture devices, e.g., cameras 120 and microphones. This may be accomplished over an ad-hoc network, e.g., to find webcams and microphones on the laptop or notebook computers of meeting participants, or via a website, e.g., detection may be accomplished by having the participants log onto a common website that manages video input from each participant or at least acquires an inventory of capture devices from those logged on.

The device location calibrator 206 analyzes the location of each device, such as each camera 120, in order to determine spatial relationships of the participants. This may be accomplished most simply by manually configuring the locations of the cameras 120 via an interface. In one implementation, the device location calibrator 206 automatically extracts the camera locations, for example, by processing the captured media. One approach uses video information. If there are overlaps between the fields of view of cameras 120, a "structure from motion" technique from computer vision can be used. Another example approach uses audio information. For example, if cameras 120 and microphones are close together, as is the case when notebook computers are present, microphone, and hence, camera locations can be determined based on relative audio energy decay. As mentioned, camera localization can also be manually configured.

An array of the available cameras, or depth cameras where available, can also be recruited to obtain 3-D attributes of a meeting participant's face, bust, or body. The 3-D information can be used to create a 3-D model of the participant for display by the spatial browser 110, instead of the spatial browser 110 being limited to displaying the conventional form of a flat, rectangular video clip.

The capture array selector 208 decides which camera views, microphone presences, and so forth to use in an ad-hoc recording (capturing) array. Many times, the selection is elementary, because there are few cameras 120 available or because the conference space is already set up with one frontal camera per participant. Eliminating a camera 120 may also depend on a quality threshold. Poor video quality may be a criterion for eliminating a camera 120 from the ad-hoc recording array.

The spatial relationships tracker 210 determines and records the spatial configuration of participants in the conference. This spatial arrangement is often similar or the same as the seating arrangement of the conference. This spatial configuration information is passed to the media stream compositor 212, which incorporates the spatial relationships between participants into the composite media stream to be recorded and/or transmitted to remote users. The spatial configuration information is extracted by the spatial browser 110 to create the spatial arrangement of video panes, foreground objects, or 3-D geometric models of the participants, as well as spatial audio, to be displayed and played (in the case of the audio) in the user interface 102.

Exemplary Spatial Browser

Figure 3:
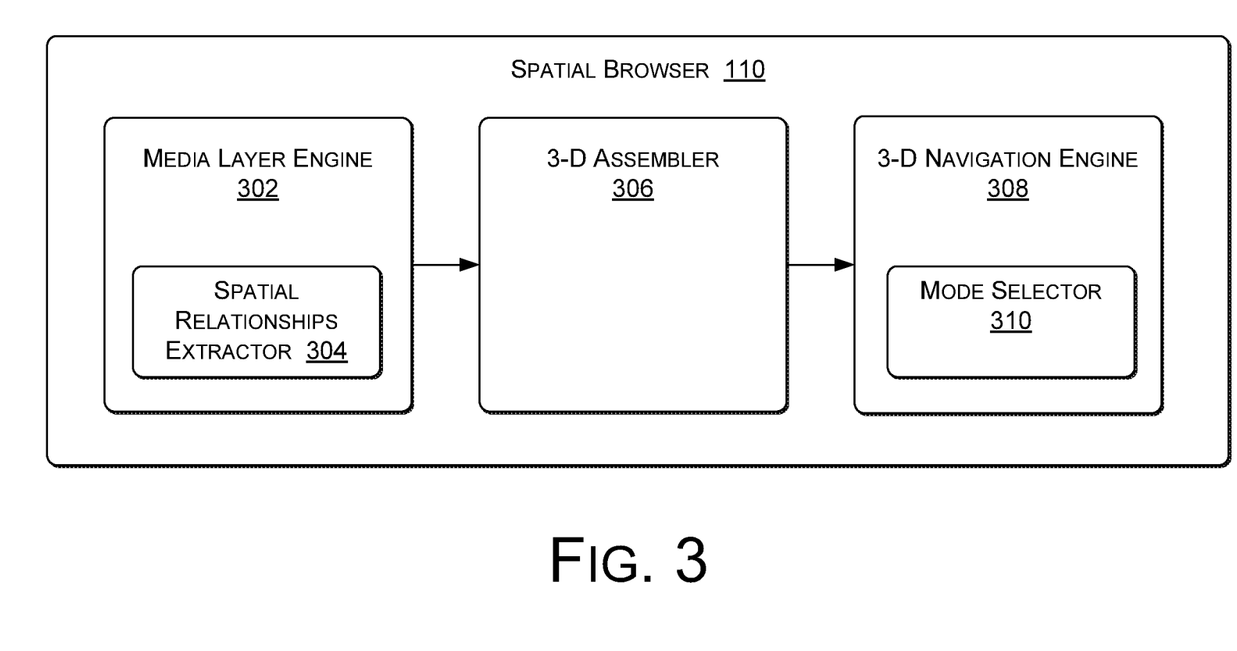
FIG. 3 is a block diagram of an exemplary spatial browser.

FIG. 3 shows an exemplary spatial browser 110. The configuration of the illustrated spatial browser 110 is just one example to assist description. Other configurations of a browser that renders spatial cues can also be used.

The exemplary spatial browser 110 includes a media layer engine 302 to extract component video streams from the composite media stream produced by the conference capture engine 116. A spatial relationships extractor 304 derives the spatial relationships information from the composite media stream. The spatial browser 110 also includes a 3-D assembler 306, and a 3-D navigation engine 308, which may include a mode selector 310. The 3-D assembler 306 receives the spatial relationship information from the spatial relationships extractor 304 and selects a 3-D paradigm for displaying the video streams of the participants. The spatial relationship information is also used to bind a given audio stream to a corresponding video stream, so that when the video stream is moved when reorienting the 3-D arrangement 114, the corresponding audio stream moves with its video stream. The selected 3-D paradigm maintains the spatial relationships between the video manifestations of the participants on the user interface 102 (generated by the spatial browser 110) in a manner analogous to the actual spatial relationships among the actual participants.

In one implementation, the 3-D assembler 306 receives spatial and/or 3-D information encoded by the conference capture engine 116 and models each participant as a 3-dimensional foreground object to be displayed instead of the captured video of the participant per se. The computation for creating a geometric model (e.g., a mesh) of each participant to be modeled can be carried out by either the computing device 118 hosting the conference capture engine 116 or by the computing device 112 hosting the spatial browser 110, depending on implementation.

In another or the same implementation, the 3-D assembler 306 may include a segmentation engine to cut the video images of the participants as foreground objects from their respective backgrounds. Then the animated videos of the participants as moving and interacting foreground objects in the spatial setting of the meeting—but minus the background showing the meeting room—can be visually placed on top of an arbitrary background to visually transport the participants from the background setting of the actual meeting room to a more imaginative or instructional background setting.

The 3-D navigation engine 308 includes perspective logic and/or 3-D engines to manipulate the spatial arrangement of video panes, foreground objects, or 3-D geometric models of the participants so that a primary view emphasizing a selected participant can be changed to a different participant—while reorienting the spatial arrangement in a way that maintains the spatial relationships of the other participants to each other in context view(s).

In one implementation, the 3-D navigation engine 308 creates alerts and notifications of various meeting events and navigation opportunities. Depending on selected mode, such notifications enable the navigation engine 308 to automatically switch from the currently interesting event to a new, latest meeting occurrence of interest, or in manual mode, notifies the user of interesting events that are detected, to give the user a choice of navigating to the interesting event (for example, to enlarge or increase the focus of a participant who is the subject of the event: e.g., Bob just put his hand over his eyes when he heard the company results).

Various kinds of notifications are incorporated by the navigation engine 308 into the user interface 102, depending on implementation. For example, the displayed video of a participant who begins speaking may have a flashing or highlighted border. In one implementation, a comic-book like metaphor shows a bubble above the heads of the speaking users. In one implementation, the spatial browser 110 may use advanced image analysis techniques (or relatively simple participant input interfaces—emotion buttons) to detect a participant's emotion. The user interface 102 may display a notification—text, color, emoticon, cartoon-bubble, etc.—of the detected emotion, shown on the user interface 102 as associated with the relevant participant. These notifications can "grab" the user's attention. In the manual mode, the user can then navigate to the part of the meeting space that better reveals whatever the user is being notified about.

The 3-D navigation engine 308 may include a mode selector 310 to transition between an automatic mode and a manual navigation mode. In the first mode, the 3-D navigation engine 308 automatically reorients the 3-dimensional arrangement to emphasize each currently interesting event such as current speaker while maintaining the spatial relationships between the facial views of the other attendees. In the second mode, navigation controls are extended to a user to enable the user to manually orient the 3-dimensional arrangement to focus on a selected participant or on a selected interaction between participants while maintaining the spatial relationships between the facial views of the participants. The manual navigation mode also allows the user to zoom, pan, rotate, and tilt the 3-dimensional environment, for example, the 3-dimensional environment that constitutes the context view.

Exemplary User Interfaces

Aspects of a meeting that are important to a viewer watching the live meeting remotely or viewing the meeting at a later time from a stored recording 122, are usually meeting-dependent. In general, meetings can be roughly classified into two types. In one type of meeting, there are a large number of attendees, but only a few of them are active. An example of such a meeting is a lecture in which there is one lecturer and a large audience. In the other type of meeting, there are a small number of attendees, but the majority of them are active. Examples of such meetings are brainstorming sessions, team weekly status meetings, and new hire discussions. In one implementation, the spatial browsing system 100 is intended primarily for the second, more interactive type of meeting, when the ratio of cameras 120 to participants 106 is nearly 1:1.

A key aspect of interactive meetings is the currently interesting event such as current speaker, a role that changes frequently. Thus, conventional conference viewing interfaces for such meetings have an automatic speaker view, which aims to always show the current speaker. But often users want speaker-related information such as who the speaker is talking to, who the speaker is looking at, and who the speaker is being interrupted by. In addition, the user often wants more control of the context views. For instance, a user may want to focus on and enlarge a non-speaking attendee in the context view.

Figure 4:
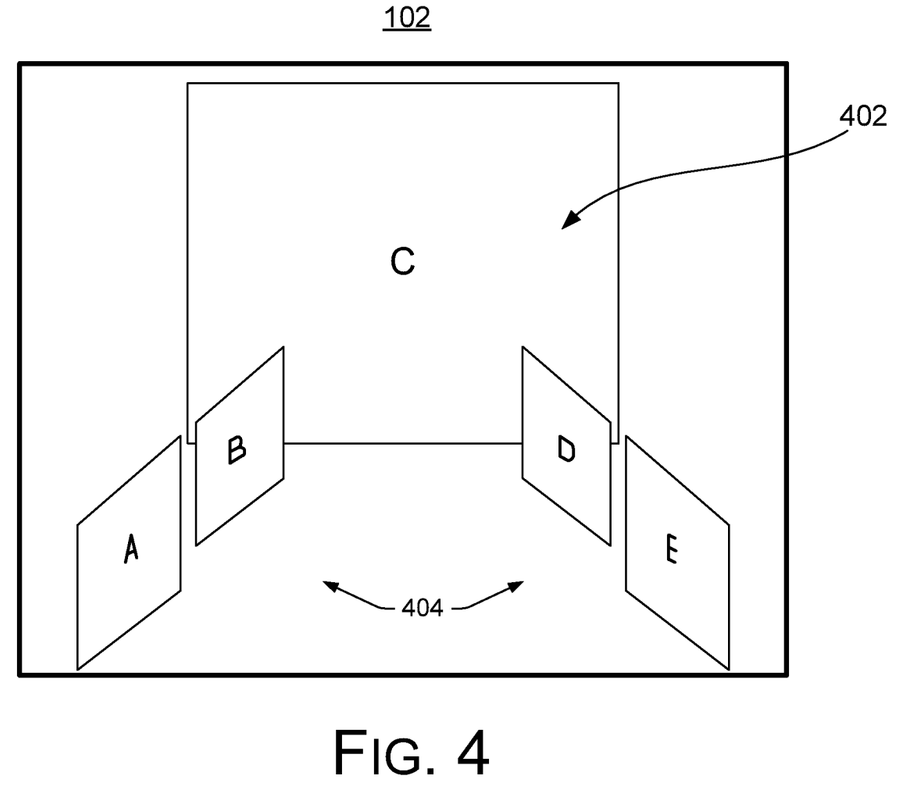
FIG. 4 is a diagram of an exemplary user interface.

FIG. 4 shows an exemplary user interface 102 generated by the spatial browser 110, in which the attendees' videos are positioned in a manner that replicates the spatial relationships (scaled to fit the interface) between the attendees in the actual meeting. In FIG. 4, since Charlie ("C") is the currently interesting event, i.e., the current speaker, in one implementation the video of the speaker, the "speaker view" 402 is large and the videos of all of the other attendees (the "context view" 404) are small. Unlike conventional meeting viewer interfaces, in which the videos of the non-speaking attendees are shown side-by-side, in the exemplary user interface 102, the positions and angles of the attendees' video panes (or "videos"), arranged in a 3-D representation, reflect the actual seating arrangement of the live attendees. For example, because Alice ("A") sits to the right of Bob ("B"), her video is positioned to the right of his. Similarly, because Eve ("E") sits to the left of Dave ("D"), her video is positioned to the left of his. In addition, because Bob and Dave face each other, their videos also face each other. Similarly, Alice's and Eve's videos face each other.

In one implementation the angles and positions of the attendees' videos are set with respect to the currently interesting event such as current speaker 402, whose video is always shown from the front, as if the user viewing the meeting is sitting across the table from the speaker. For instance, when Charlie is the speaker, the user sees the meeting from the place on the table directly opposite of Charlie. Therefore, Charlie's video is positioned so that it appears to be farther away than Bob's and Eve's videos, which are in turn, positioned so that they appear to be farther away than Alice's and Eve's videos.

In one implementation, in order to prevent one video from obscuring another video, the spatial browser 110 may use alpha blending techniques to show the video in front as semi-transparent.

Compared to conventional 2-D interfaces, the exemplary 3-D user interface 102 makes it easier to understand who the speaker is looking at. For example, during the meeting, when Charlie looks at Alice or Eve, his eyes or head turn slightly to the right or left, respectively. When Charlie looks at Bob or Dave, his eyes and head turn significantly right or left, respectively. Since in the interface, the user is looking directly at Charlie when Charlie is the speaker, the user can tell who Charlie is looking at by following his eyes and/or head motions.

When the speaker changes, a large video of the new speaker is shown from the front. The videos of all of the other attendees are shown as small. Moreover, the positions of the videos are rearranged to display the correct spatial information of the attendees with respect to the new speaker.

Figure 5:
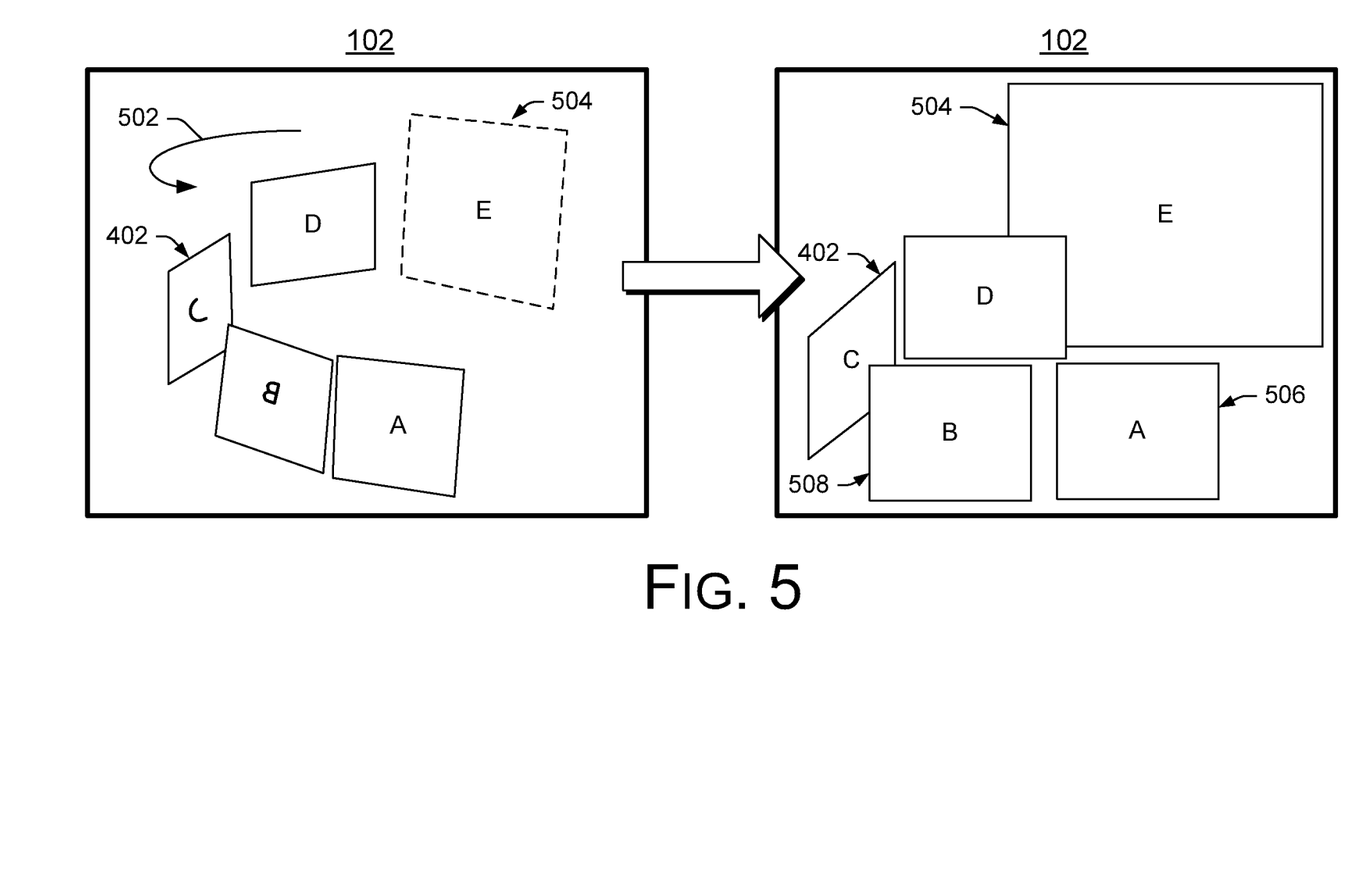
FIG. 5 is a diagram of a transition between exemplary user interface views.

In the above example, the current speaker may change from Charlie to Eve. In a conventional 2-D interface, the large video of Charlie simply cuts from Charlie to Eve. The only aspect that changes in the conventional viewer interface is the large video of the speaker at the center. The exemplary user interface 102 could also simply "cut" to Eve by instantaneously switching the sizes and positions of displayed videos, e.g., Eve's video would be made large while the other videos would be made small, instantaneously. However, to avoid confusing the user by many parts of the user interface 102 changing suddenly, the user interface 102 gradually rotates around the center of the table as shown in FIG. 5. In one implementation, during the rotation 502, the large video of Charlie 402, who was the previous speaker, fades out and the new large video 504 of the new speaker, Eve, fades in.

One issue that sometimes occurs in the user interface 102 is how to display the video of the attendees who are on the opposite side of the table from the speaker. Typically, the cameras 120 for capturing the conference 104 are on a conference table, so no cameras 120 capture the attendees from a rear view. Nevertheless, the spatial browser 110 still shows the videos of these attendees as captured by cameras 120 on the table. Because of the 3-D arrangement 114, showing a frontal view as a substitute for a rear view causes the attendee's eye movements and body gestures to be reversed. Thus, when Alice looks at Dave, it would appear to the user as if she is incorrectly looking to the right. To correct the issue, the spatial browser 110 horizontally inverts or "flips" the videos of the attendees who are being viewed from the rear, when in the context of the 3-D arrangement 114. For example, when Eve is the speaker, the video of Alice 506 and the video of Bob 508 are horizontally inverted in the user interface 102 as shown in FIG. 5. This allows users to correctly interpret gestures and interactions between the attendees.

In one mode, enabled by the mode selector 310, the spatial browser 110 extends navigation controls to the user. This provides users of the spatial browser 110 with the ability to focus on any attendee or any part of the meeting room. Thus, in one implementation, such navigation controls enable the user to click on any of the displayed videos to show a larger version of that video. Since the user interface 102 already shows the currently interesting event such as current speaker in an enlarged video, showing an additional large video may be confusing.

Figure 6:
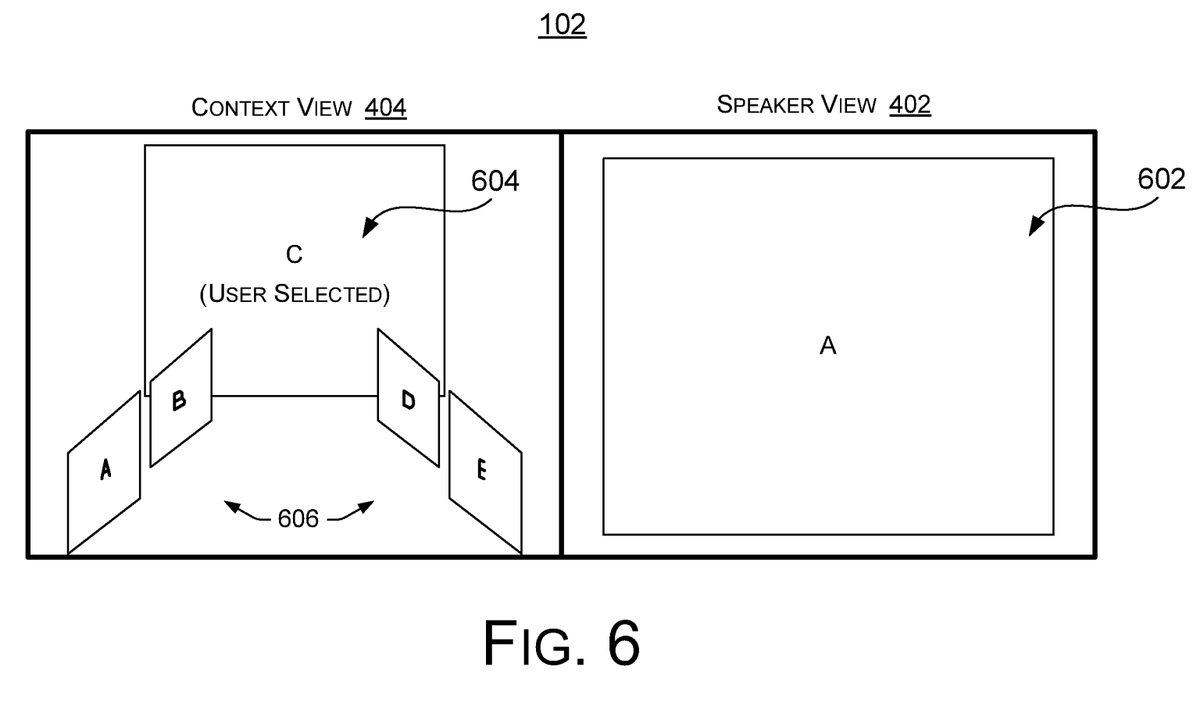
FIG. 6 is a diagram of an exemplary user interface that provides separate speaker and context views.

As shown in FIG. 6, a less confusing technique is to separate the enlarged video of the speaker view 602 from the enlarged video of a non-speaker view 604, i.e., the enlarged video from the context view 404. In FIG. 6, the speaker view 402 displays Alice 602, the current speaker, while the context view 404 shows an analogy of the seating arrangement 606 of the attendees via the locations of their videos on the display 108, including an enlarged video of a selected non-speaker 604, in this case, Charlie. The context view 404 allows the user to focus on a particular attendee by clicking on that attendee's video to enlarge the video. Thus, in user-controlled mode, when Charlie is selected as the focus, the 3-D navigation engine 308 rotates the 3-D arrangement 114 around the center of the table until Charlie's video 604 is positioned at the center, and enlarged.

The user interface 102 can thus have two implementations to match the two modes selectable via the mode selector 310. In one mode of the user interface 102, the speaker and context views are combined into a single view as shown in FIG. 4. This corresponds to the automatic mode selectable via the mode selector 310, since the user does not interact with the combined view, but instead the 3-D navigation engine 308 automatically changes the focus to whoever is speaking. In the second mode, the speaker and context views are shown separately, as illustrated in FIG. 6. This corresponds to the user-controlled mode selectable via the mode selector 310, because the user can control the context view 404.

Figure 7:
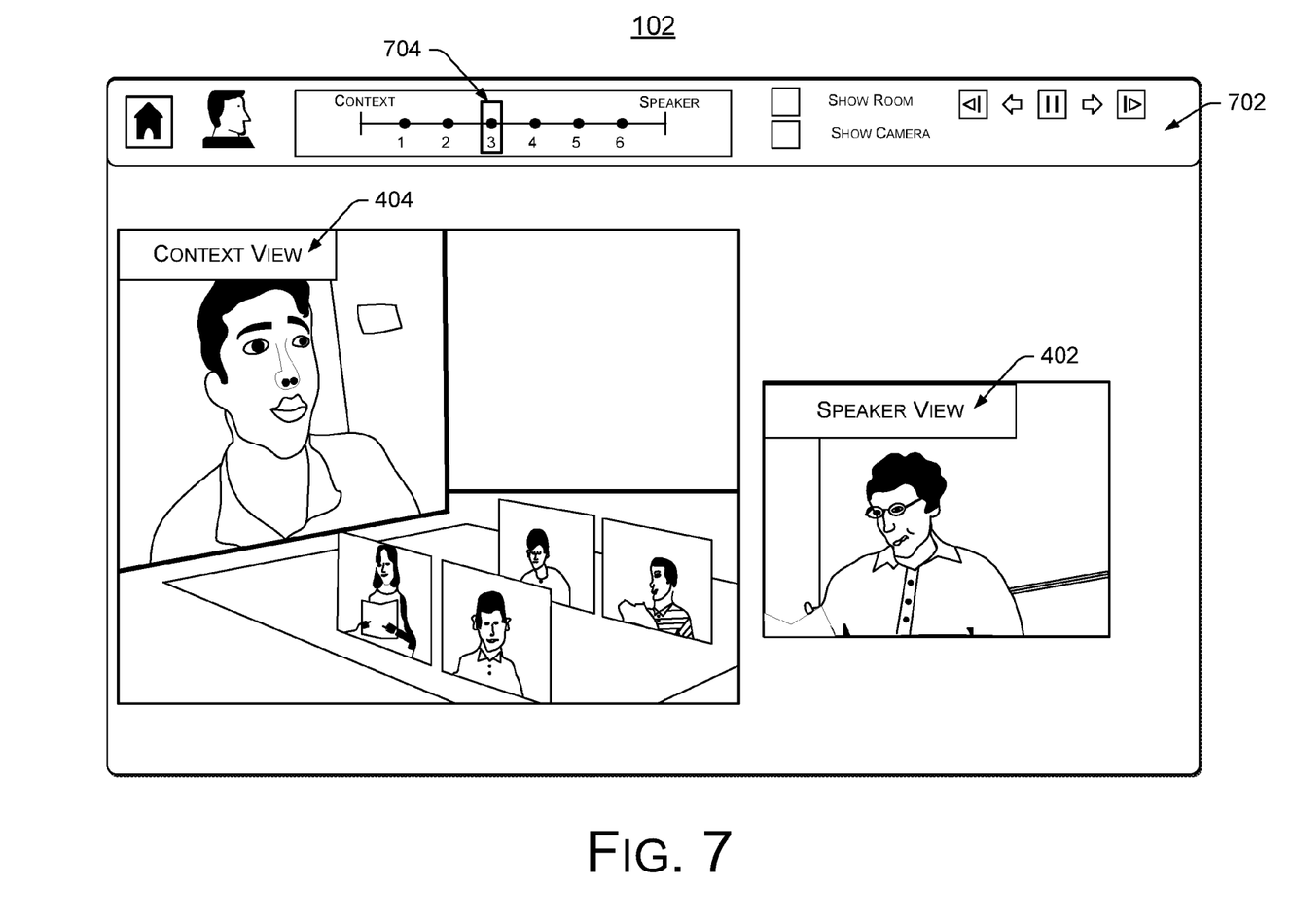
FIG. 7 is a diagram of an exemplary user interface that provides navigation controls.

When separating the speaker and context views, users may have different preferences for the relative sizes of these two views. The spatial browser 110 can address this issue by allowing the user to adjust relative sizes of the two views. FIG. 7 shows an implementation of the exemplary user interface 102, in which the spatial browser 110 extends navigation controls 702. The navigation controls 702 typically include a keyboard and/or a mouse, e.g., to click on videos that the user wants to focus on, emphasize, and/or enlarge. Despite the manual nature of the navigation controls 702, such an implementation of the user interface 102 still provides an automatically updating speaker view 402 and a context view 404 that automatically maintains the spatial relationships between participants no matter which way the view is rotated to enlarge a given participant or speaker. Users who have different preferences for the relative sizes of the two views (the speaker view 402 and the context view 404) can utilize a control such as a slider 704 to adjust the relative sizes of the two views 402, 404, as shown in FIG. 7.

Moreover, the user can utilize navigation controls 702 to zoom in and out, pan, rotate, and tilt the 3-D environment shown in the context view 404. The navigation controls 702 may be similar to those of popular mapping applications such as VIRTUAL EARTH and GOOGLE MAPS. For example, the spatial browser 110 may support panning by dragging any part of the context view; tilting or rotating by holding down the CTRL key and dragging; and zooming by holding down the SHIFT key and dragging. The user generally avails of the navigation controls 702 to achieve a better view of the conference 104 or to focus on a particular attendee in the context view 404. For example, Alice's comments may trigger a side conversation between Charlie and Dave. Since Alice continues to talk, the automatic speaker view mode continues to show Alice. To see the side conversation between Charlie and Dave, the user can either click on Charlie's video to see his expression or zoom-in on the shown environment and adjust the tilt and pan to see Charlie's and Dave's videos clearly in the context view.

Most implementations of the exemplary user interface 102 display a speaker view 402 that always shows the currently interesting event such as current speaker. However, there are some meetings in which more than one person may speak at the same time. In one implementation the user interface 102 shows two videos of the two speakers (instead of one video) in the speaker view 402, e.g., by displaying the speakers side-by-side, or picture-in-picture, etc. This avoids a need to constantly switch the view between speakers, including switching the orientation of all the attendee videos in the context view 404 every time the speaker view 402 changes. Such frequent movement between speakers in the speaker view 402 can be very distracting and is avoided by the exemplary spatial browser 110.

Exemplary Methods

Figure 8:
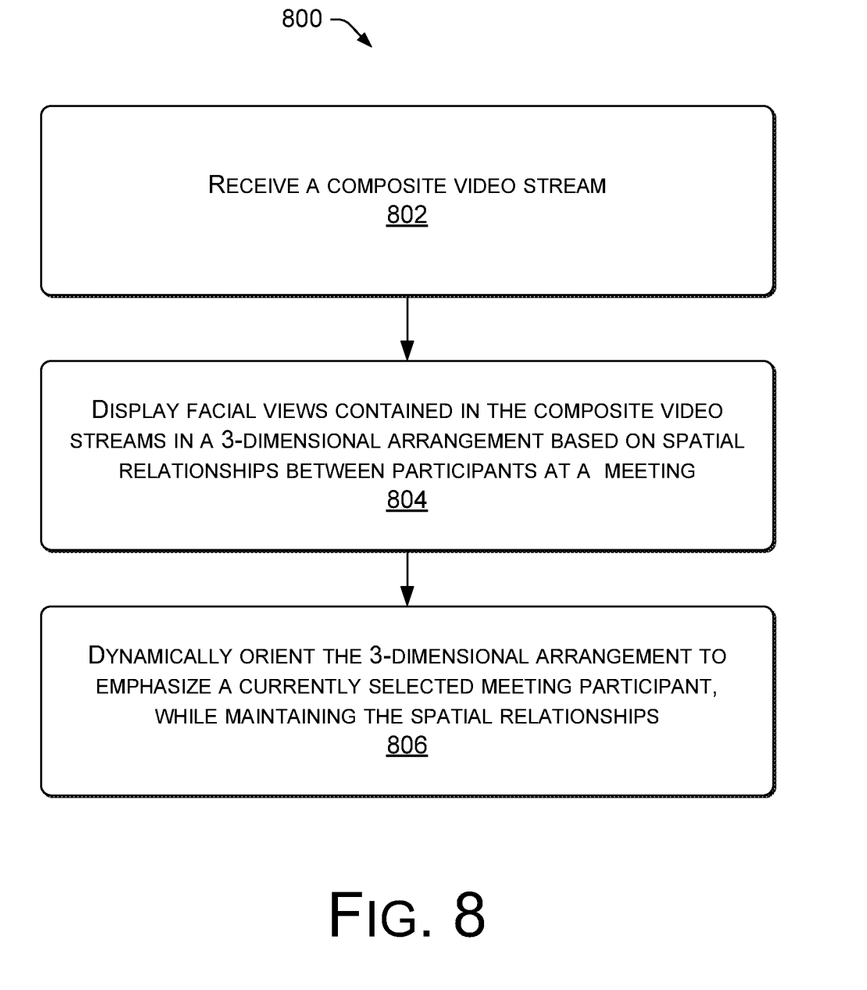
FIG. 8 is a flow diagram of an exemplary method of spatially displaying participants of a conference.

FIG. 8 shows an exemplary method 800 of spatially displaying participants in a conference. In the flow diagram, the operations are summarized in individual blocks. The exemplary method 800 may be performed by hardware and software, for example, by components of the exemplary spatial browser 110.

At block 802, a composite media stream is received, e.g., containing component media streams, such as component video streams and component audio streams, each component video stream showing a view of one of multiple meeting participants. The composite media stream contains spatial information including a spatial relationship of each meeting participant with respect to at least one other meeting participant.

At block 804, views contained in the component video streams are displayed in a 3-dimensional arrangement based on the spatial relationships between the meeting participants. Each view is shown in perspective according to the 3-dimensional arrangement.

In one implementation, videos of views that are displayed in the 3-dimensional arrangement can overlap each other on the display adding to the perception of 3-dimensionality. But to keep one video from blocking part of another, some parts of one view may be rendered as semi-transparent in order to let the user see the obstructed view.

Dynamically orienting the 3-dimensional arrangement to emphasize a selected meeting participant can include visually rotating the 3-dimensional arrangement around a center point or other rotation point of the portrayed seating arrangement. When the portrayed seating arrangement implies a rear view of a meeting participant, then the frontal view of the meeting participant can be horizontally inverted to preserve correct directionality of eye movements and body gestures in the 3-dimensional arrangement.

At block 806, the 3-dimensional arrangement is dynamically oriented to emphasize a currently selected meeting participant, while maintaining the spatial relationships of the 3-dimensional arrangement of facial views of the other meeting participants. Emphasizing a selected meeting participant may include increasing a focus on the selected meeting participant; enlarging the facial view of the selected meeting participant; centering a facial view of the selected meeting participant on a 2-dimensional display; decreasing a transparency of the facial view of the selected meeting participant; fading-in to the selected meeting participant while fading-out at least one other meeting participant; highlighting the meeting participant, and/or moving the facial view of the selected meeting participant to a reserved part of the 2-dimensional display.

In one implementation, the method 800 includes creating alerts and notifications of various meeting events and navigation opportunities. Depending on selected mode, such notifications can automatically switch the most recent currently interesting event to a new meeting occurrence of interest, which then becomes the currently interesting event. In manual mode, the notifications alert the user of interesting events that are detected, to give the user a choice of navigating to the interesting event (for example, to enlarge or increase the focus of a participant who is the subject of the event: e.g., Bob just put his hand over his eyes when he heard the company results.)

Various kinds of notifications are incorporated by the navigation engine 308 into the user interface 102, depending on implementation. For example, the displayed video of a participant who begins speaking may have a flashing or highlighted border. In one implementation, a comic-book like metaphor shows a bubble above the heads of the speaking users. In one implementation, the method 800 may use advanced image analysis techniques (or relatively simple participant input interfaces—emotion buttons) to detect a participant's emotion. The method 800 then includes displaying a notification—text, color, emoticon, cartoon-bubble, etc.—of the detected emotion, shown on the user interface 102 as associated with the relevant participant. These notifications can "grab" the user's attention. In a manual mode, the user can then navigate to the part of the meeting space that better shows whatever the user is being notified about.

In an automatic mode, dynamically orienting the 3-dimensional arrangement to emphasize a selected meeting participant includes automatically reorienting the entire 3-dimensional arrangement to emphasize each currently interesting event such as current speaker, while maintaining the spatial relationships between the facial views of the other meeting participants as a changeable and spatially modeled context view.

When two meeting participants rapidly alternate speaking (or speak at the same time), then emphasizing both speakers can be accomplished by placing videos of both speakers in a single enlarged viewing pane or in a viewing perspective reserved for one or more currently interesting events.

In a manual navigation mode, navigation controls are made available to a user for manually orienting at least the context view of the 3-dimensional arrangement. The user may perform zooming, panning, rotating, and tilting the context view, to achieve a better view of a particular meeting participant.

Figure 9:
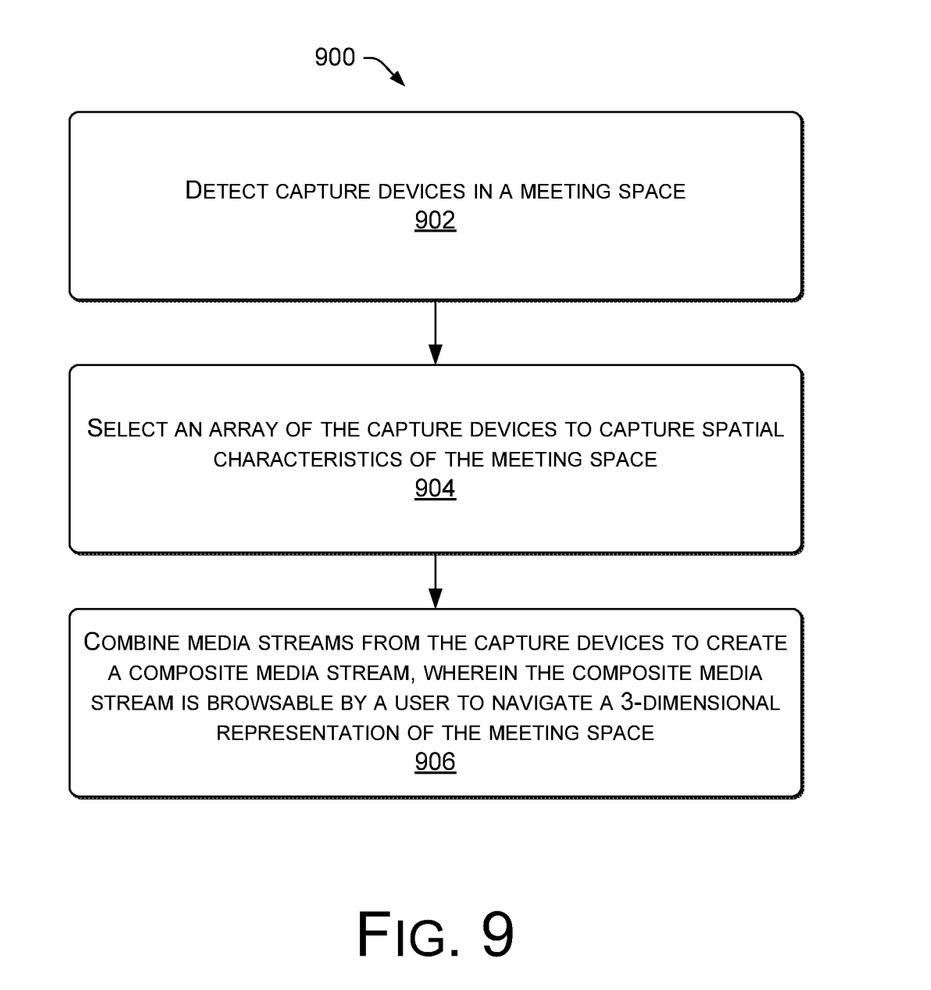
FIG. 9 is a flow diagram of an exemplary method of performing multi-device capture of a conference.

FIG. 9 shows an exemplary method 900 of performing multi-device capture of a conference. In the flow diagram, the operations are summarized in individual blocks. The exemplary method 900 may be performed by hardware and software, for example, by components of the exemplary conference capture engine 116 and the exemplary spatial browser 110.

At block 902, capture devices, such as cameras, laptop and notebook computer webcams, omnidirectional conference cams, and microphones, etc., are detected in a meeting space. Detection may be achieved by having participants connect to an ad-hoc network hosted for the conference and/or for the express purpose of detecting capture devices. Or, detection may be accomplished by having the participants log onto a common website that manages video input from each participant or at least acquires an inventory of capture devices from those logged on. Capture devices may also be detected manually, by a human operator taking an inventory, in which case detecting capture devices consists of receiving user input.

At block 904, an array of the capture devices is selected to capture spatial characteristics of the meeting space. Selecting the array of capture devices, such as cameras, can include detecting or inputting a location and a view angle of each camera and calibrating the locations and the view angles with each other to determine the spatial characteristics. The relative position of each meeting participant can be determined by sharing and calibrating information between the cameras or other capture devices.

At block 906, video streams from the capture devices are combined to create a composite media stream. The composite media stream is browsable by a user to navigate a 3-dimensional representation of the meeting space. Video streams from the cameras and audio streams from the microphones can be combined to create a composite audio-video stream that is browsable by a user to navigate a 3-dimensional representation of the meeting space, including visual views, and spatial audio, such as stereo sound, and surround-sound.

Conclusion

Although exemplary systems have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:
1. A computing system comprising:
a memory device or storage device storing software; and
a processing device configured to execute the software, wherein the software causes the processing device to:
obtain multiple video streams from multiple cameras in a physical location where an activity occurs;

gather, from individual video streams, three-dimensional shape information of participants in the activity; and encode the three-dimensional shape information into an output video stream.

2. The computing system of claim 1, wherein the software causes the processing device to:

determine spatial configuration information reflecting a spatial configuration of the participants in the activity; and incorporate the spatial configuration information into the output video stream.

3. The computing system of claim 1, wherein the activity is a meeting or a conference.

4. The computing system of claim 1, wherein the software causes the processing device to:

send the output video stream to at least one other computing system that renders one or more views of the activity from the output video stream.

5. The computing system of claim 4, wherein the software causes the processing device to:

construct the output video stream such that the output stream is browsable by the at least one other computing system to navigate to different views of the physical location.

6. The computing system of claim 1, wherein the software causes the processing device to:

create a geometric model of an individual meeting participant.

7. The computing system of claim 6, wherein the geometric model is a geometric mesh.

8. The computing system of claim 1, wherein the software causes the processing device to:

calibrate locations of the multiple cameras;

use the calibrated locations to determine spatial characteristics of the physical location; and incorporate the spatial characteristics of the physical location into the output video stream.

9. A computing system comprising:

a memory device or storage device storing software; and a processing device configured to execute the software, wherein the software causes the processing device to:

receive a video stream of participants in an activity;

obtain, using the video stream, a first geometric model of a first individual participant; and display a view showing a first representation of the first individual participant, the first representation being based on the first geometric model.

10. The computing system of claim 9, wherein the software causes the processing device to:

obtain a second geometric model of a second individual participant, the second geometric model also being obtained using the video stream; and show a second representation of the second individual participant in the view with the first representation of the first individual participant, the second representation being based on the second geometric model.

11. The computing system of claim 10, wherein the view maintains a spatial relationship between the first individual participant and the second individual participant.

12. The computing system of claim 11, wherein the software causes the processing device to:

zoom, pan, rotate, or tilt the view while preserving the spatial relationship between the first individual participant and the second individual participant.

13. The computing system of claim 9, wherein the software causes the processing device to:

obtain the first geometric model by receiving the first geometric model in the video stream.

14. The computing system of claim 9, wherein the software causes the processing device to:

obtain the first geometric model by receiving spatial or three-dimensional information and computing the first geometric model using the spatial or three-dimensional information.

15. A method performed by at least one computing device, the method comprising:

obtaining multiple video streams from multiple cameras in a physical location where an activity occurs;

obtaining, using the multiple video streams, three-dimensional shape information of participants in the activity; and computing a geometric model of an individual participant in the activity, the geometric model being computed using the three-dimensional shape information.

16. The method of claim 15, further comprising:

generating a view showing a representation of the individual participant, the representation being based on the geometric model.

17. The method of claim 16, further comprising:

panning the view responsive to a user input.

18. The method of claim 17, wherein the user input is a dragging input.

19. The method of claim 16, further comprising:

automatically reorienting the view to emphasize a particular event at the activity.

20. The method of claim 15, wherein the multiple cameras comprise infrared depth cameras.

* * * * *